US008588458B2

(12) United States Patent
Ono (10) Patent No.: US 8,588,458 B2
(45) Date of Patent: Nov. 19, 2013

(54) IMAGE PROCESSING APPARATUS, IMAGE PROCESSING METHOD, AND PROGRAM

(75) Inventor: Hiroaki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 957 days.

(21) Appl. No.: 12/360,779

(22) Filed: Jan. 27, 2009

(65) Prior Publication Data

US 2009/0190801 A1     Jul. 30, 2009

(30) Foreign Application Priority Data

Jan. 30, 2008 (JP) ................ P2008-018636

(51) Int. Cl.
*G06K 9/00* (2006.01)
*G06K 9/46* (2006.01)

(52) U.S. Cl.
USPC ............................ 382/100; 382/103; 382/194

(58) Field of Classification Search
USPC ........... 382/100, 107, 254, 276; 358/530, 540
See application file for complete search history.

(56) References Cited

U.S. PATENT DOCUMENTS

| 4,233,631 | A  | * | 11/1980 | Mahler | 348/579 |
| 6,335,985 | B1 | * | 1/2002 | Sambonsugi et al. | 382/190 |
| 2007/0268364 | A1 | * | 11/2007 | Neff et al. | 348/143 |
| 2007/0269135 | A1 | * | 11/2007 | Ono | 382/276 |

FOREIGN PATENT DOCUMENTS

| JP | 10-290450 | 10/1998 |
| JP | 2005-123824 | 5/2005 |
| JP | 2007-328755 | 12/2007 |

* cited by examiner

*Primary Examiner* — David Zarka
*Assistant Examiner* — Avinash J Yentrapati
(74) *Attorney, Agent, or Firm* — Finnegan, Henderson, Farabow, Garrett & Dunner, L.L.P.

(57) ABSTRACT

An image processing apparatus includes: a pixel selecting unit that selects pixel values which are provided at each of pixel positions in input images that are arranged in chronological sequence, each of the pixel values being included in a corresponding one of the input images, on the basis of an input image to be processed which is set in the middle of the sequence; a moving-object detecting unit that detects a moving object using the selected pixel values, and that produces information items concerning the moving object as moving-object information items; and an output-image generating unit that generates pixel values of an output image, each of the pixel values being generated for a corresponding one of the pixel positions by using, in accordance with a corresponding one of the moving-object information items, a corresponding one of pixel values of the input image to be processed.

19 Claims, 10 Drawing Sheets

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2008-018636 filed in the Japanese Patent Office on Jan. 30, 2008, the entire contents of which are incorporated herein by reference.

BACKGROUND OF THE INVENTION

1. Field of the Invention

The present invention relates to an image processing apparatus, and, more particularly, to an image processing apparatus that displays paths indicated in pickup images which were chronologically picked up, and an image processing method therefor, and a program that causes a computer to execute the image processing method.

2. Description of the Related Art

As a method for generating an image that indicates paths of a moving object by using pickup images (hereinafter, referred to as "frame images") which were chronologically picked up, for example, a method for performing compositing by simply superimposing frame images on one another is considered. By using this simple method, the larger the number of frames, the lower the contribution ratio of one frame to a composition result. Accordingly, there is a problem that the color of paths of a moving object becomes light. For example, supposing that five frame images are provided as shown in parts (a) to (e) of FIG. 7, when compositing is simply performed, the contribution ratio of pixels to a composition result becomes 20%. Compositing is performed with the ratio between a moving object and a background that is 20% : 80% for pixel positions which a moving object crosses over. Thus, the color of paths of the moving object becomes light as shown in FIG. 8C.

In contrast, as a method obtained by making improvements to the simple compositing, a method is proposed, in which frame images are extracted from image data, in which weights are assigned to pixels in accordance with brightness values, and in which compositing is performed by combining the pixels having the weights with one another to obtain one still image (for example, see Japanese Unexamined Patent Application Publication No. 10-290450 (FIG. 1)). In this technique in the related art, regarding pixels that are provided at the same pixel position in the frame images, when pixels have brightness values whose distances from the average of brightness values are longer than the variance of brightness values, high weights are assigned to the pixels. When pixels having brightness values whose distances from the average of brightness values are shorter than the variance of brightness values, low weights are assigned to the pixels. Then, compositing is performed by combining the pixels having the weights with one another. A pixel that is provided at the same pixel position in an output image is output as a result of compositing. In this manner, in a composition image, weights that are used for a moving object are higher than those that are used for a background, and the color of paths of the moving object is darker than that of paths of the moving object that were obtained using the simple compositing method.

Furthermore, a method is proposed, in which a moving object is extracted, and in which compositing is performed for paths of the moving object by tracking the moving object (for example, see Japanese Unexamined Patent Application Publication No. 2005-123824 (FIG. 1)). In this technique in the related art, when a moving object is not tracked, data on the moving object is interpolated using characteristic values or positions of the moving object that were obtained at times when the moving object was successfully tracked, thereby increasing the accuracy with which the moving object is extracted and tracked.

A positive effect is obtained, in which the color of paths of a moving object which are obtained using a method for performing compositing by using higher weights for the moving object is darker than that of paths of the moving object that were obtained using the simple compositing method. However, in the method for performing compositing by using higher weights for the moving object, multiple compositing is performed by using the same weights for portions other, than a background. Accordingly, the larger the number of frame images indicating portions other than the background is, the lower the contribution ratio of one frame image to paths. In such a case, it is difficult to generate paths having a color that is as dark as that of paths indicated in an original image. Furthermore, when a method for determining a background by using the variance of brightness values is used, clear distinction between a background and the other portions is sometimes difficult depending on the states of images. Additionally, when the method for tracking a moving object, which is provided in the related art, is used, paths can be displayed in any manner while data on a moving object is being interpolated. However, in this case, because a region in which the moving object exists, the color of the moving object, the brightness of the moving object, the texture of the moving object, and so forth are used as characteristic values, there is a problem that the method does not deal with changes in the characteristic values, deformation of the moving object, or the like. Moreover, when the number of moving objects is large, there is a problem that it is difficult to track all moving objects in view of cost for calculation or the like.

An image processing apparatus is proposed, which generates a path still image or a path moving image of a moving object by determining a background image in advance, by calculating the dissimilarities between pixel values of the background image and pixel values of input images, and by using the pixel values of the input image for a path-composition image, which is to serve as an output image, in accordance with the dissimilarities (for example, see Japanese Unexamined Patent Application Publication No. 2007-328755 (FIG. 2)).

SUMMARY OF THE INVENTION

As described above, when the method for using pixel values of input images for a path-composition image in accordance with the dissimilarities between the pixel values of the input images and pixel values of a background image is used, the more different from the background the region is, the higher the contribution ratio of the region to the path-composition image. Accordingly, paths of a moving object can be obtained with a darker color. However, in this case, because the background image is calculated in advance, there is a problem that a waiting time is necessary until display of the path-composition image starts. Furthermore, because all of the input images are necessary in order to generate the background image, there is a problem that compositing is not performed for paths until an end point of image pickup is determined. Moreover, when the background is generated in advance, there is a risk that a malfunction occurs when image pickup is performed for a period of time which is longer than a certain value because it is difficult to follow fluctuations in the background.

In view of the above-described circumstances, it is desirable to perform generation of a path-composition image with a high responsiveness and stability.

According to a first embodiment of the present invention, there is provided an image processing apparatus, an image processing method therefor, and a program. The image processing apparatus includes the following elements: pixel selecting means for selecting pixel values that are provided at each of pixel positions in input images which are arranged in chronological sequence, each of the pixel values being included in a corresponding one of the input images, on the basis of an input image to be processed that is set in the middle of the sequence; moving-object detecting means for detecting a moving object using the selected pixel values, and producing information items concerning the moving object as moving-object information items; and output-image generating means for generating pixel values of an output image, each of the pixel values being generated for a corresponding one of the pixel positions by using, in accordance with a corresponding one of the moving-object information items, a corresponding one of pixel values of the input image to be processed. Therefore, advantageously, a moving object can be detected using the pixel values which are selected on the basis of the input image to be processed that is set in the middle of the sequence, and the pixel values of the output image can be generated in accordance with the information items concerning the moving object.

Furthermore, in the first embodiment, the moving-object detecting means may calculate, as the moving-object information items, probabilities that the pixel values of the input image to be processed indicate a moving object. In this case, the moving-object detecting means may calculate, as each of probabilities that a corresponding one of the pixel values of the input image to be processed indicates a moving object, each of probabilities that the pixel values that are chronologically selected for a corresponding one of the pixel positions in the input images on the basis of the input image to be processed, which is set in the middle of the sequence, do not exist in a predetermined range that is provided on the basis of the corresponding one of the pixel values of the image to be processed.

Moreover, in the first embodiment, the pixel selecting means may select the pixel values at regular time intervals. In addition, the pixel selecting means may select the pixel values in such a manner that the closer to the input image to be processed the input images are, the higher the frequency with which the pixel values are selected in the input images. Therefore, advantageously, by thinning out pixel values in order to select pixel values, the number of pixel values can be reduced without changing a time range for selection of pixel values, and degradation of the accuracy with which a moving-object probability is calculated can be reduced.

Additionally, in the first embodiment, the output-image generating means may include the following elements: output-image storing means for storing the pixel values of the output image; composition-ratio generating means for generating composition ratios, each of the composition ratios being generated for a corresponding one of the pixel positions in accordance with a corresponding one of the moving-object information items; and composition-value calculating means for obtaining pixel values, each of the pixel values being obtained for a corresponding one of the pixel positions by combining a corresponding one of the pixel values of the input image to be processed with a corresponding one of the pixel values of the output image, which are stored by the output-image storing means, using a corresponding one of the composition ratios, and for causing the output-image storing means to store the obtained pixel values as pixel values of a new output image. Therefore, advantageously, the pixel values of the input image to be processed can be combined with the pixel values of the output image by using the composition ratios which are generated in accordance with the moving-object information items. Furthermore, in this case, the moving-object detecting means may calculate, as the moving-object information items, probabilities that the pixel values of the input image to be processed indicate a moving object. The output-image generating means may further include background-composition-ratio storing means for storing, as background composition ratios, the composition ratios for a case in which the pixel values of the input image to be processed do not indicate a moving object. The composition-ratio generating means may generate the composition ratios on the basis of the probabilities that the pixel values of the input image to be processed indicate a moving object and on the basis of the background composition ratios. Therefore, advantageously, the pixel values of the input image to be processed can be combined with the pixel values of the output image by using the composition ratios which are generated on the basis of the probabilities that the pixel values of the input image to be processed indicate a moving object and on the basis of the background composition ratios.

According to the embodiment of the present invention, a great advantage can be achieved, in which generation of a path-composition image with a high responsiveness and stability can be realized.

DESCRIPTION OF THE PREFERRED EMBODIMENTS

Next, embodiments of the present invention will be described in detail with reference to the accompanying drawings.

Figure 1:
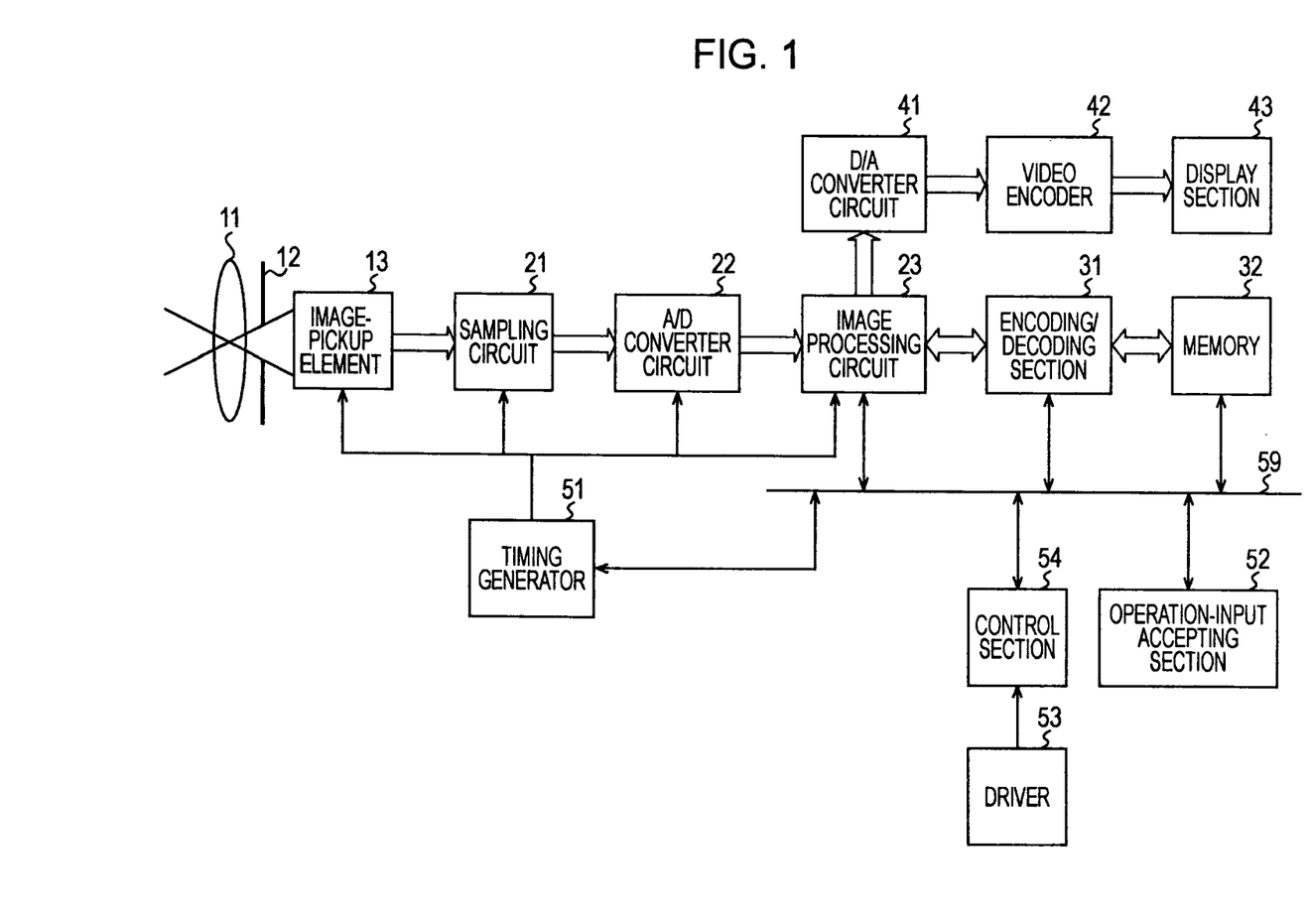
FIG. 1 is a diagram showing an example of an image-pickup apparatus according to an embodiment of the present invention.

FIG. 1 is a diagram showing an example of an image-pickup apparatus according to an embodiment of the present invention. The image-pickup apparatus includes an optical system, a signal processing system, a recording system, a display system, and a control system when constituents of the image-pickup apparatus are broadly classified.

The optical system includes, a lens 11 that gathers light to obtain an optical image of an object, an aperture 12 that adjusts the light amount of the optical image, and an image-pickup element 13 that photoelectrically converts the optical image, which is obtained by gathering light, into an electric signal. The image-pickup element 13 is realized using, for example, a charge coupled device (CCD) image sensor or the like.

The signal processing system includes a sampling circuit 21 that samples the electric signal which is supplied from the image-pickup element 13, an A/D converter circuit 22 that converts an analog signal, which is supplied from the sampling circuit 21, into a digital signal, and an image processing circuit 23 that performs predetermined image processing on the digital signal, which is input from the A/D converter circuit 22. The sampling circuit 21 is realized using, for example, a correlated double sampling (CDS) circuit. By using the CDS circuit, noise that occurs in the image-pickup element 13 is reduced. Note that the details of the image processing performed by the image processing circuit 23 will be described below.

The recording system includes a memory 32 that stores an image signal, and an encoding/decoding section 31. The encoding/decoding section 31 encodes an image signal that is processed by the image processing circuit 23, and records the image signal in the memory 32. Additionally, the encoding/decoding section 31 reads the image signal from the memory 32, decodes the image signal, and supplies the image signal to the image processing circuit 23.

The display system includes a D/A converter circuit 41 that converts the image signal, which is processed by the image processing circuit 23, into an analog image signal, a video encoder 42 that encodes the analog image signal to a video signal having a format which is suitable for a display section 43, which is provided as a subsequent stage, and the display section 43 that displays an image corresponding to the video signal which is input to the display section 43. The display section 43 is realized using, for example, a liquid crystal display (LCD) or the like, and has a function of serving as a finder.

The control system includes a timing generator 51, an operation-input accepting section 52, a driver 53 that is used to connect a peripheral device to the image-pickup apparatus, and a control section 54 that performs overall control of the image-pickup apparatus. The timing generator 51 controls operation timing for the image-pickup element 13, the sampling circuit 21, the A/D converter circuit 22, and the image processing circuit 23. The operation-input accepting section 52 accepts a shutter operation, which is performed by a user, and other command inputs. A device such as a magnetic disk, an optical disk, a magneto-optical disk, or a semiconductor memory is connected to the driver 53. The control section 54 reads a control program that is stored in such a device via the driver 53, and performs control on the basis of the control program that is read, the commands that are input from the operation-input accepting section 52 by the user, or the like.

The image processing circuit 23, the encoding/decoding section 31, the memory 32, the timing generator 51, the operation-input accepting section 52, and the control section 54 are connected to one another via a bus 59.

In the image-pickup apparatus, an optical image (incident light) of an object enters the image-pickup element 13 via the lens 11 and the aperture 12, and is photoelectrically converted into an electric signal by the image-pickup element 13. Noise elements are removed from the obtained electric signal by the sampling circuit 21, and the electric signal is converted into a digital signal by the A/D converter circuit 22. Then, the digital signal is temporarily stored in an image memory (not illustrated) that is embedded in the image processing circuit 23.

Note that, in a normal state, an image signal is continuously overwritten at a fixed frame rate in the image memory, which is embedded in the image processing circuit 23, by control that is performed by the timing generator 51 for the signal processing system. The image signal in the image memory, which is embedded in the image processing circuit 23, is converted into an analog signal by the D/A converter circuit 41. The analog signal is encoded into a video signal, and an image corresponding to the video signal is displayed on the display section 43.

The display section 43 also has a function of serving as a finder of the image-pickup apparatus. When a user pushes a shutter button that is included in the operation-input accepting section 52, the control section 54 causes the timing generator 51 to control the signal processing system so that an image signal that is obtained immediately after the shutter was pushed is stored, i.e., so that the image signal is not overwritten in the memory embedded in the image processing circuit 23. The image signal that is stored in the image memory embedded in the image processing circuit 23 is encoded by the encoding/decoding section 31, and is recorded in the memory 32. Capturing of data corresponding to one image is completed by the above-described operation of the image-pickup apparatus.

Figure 2:
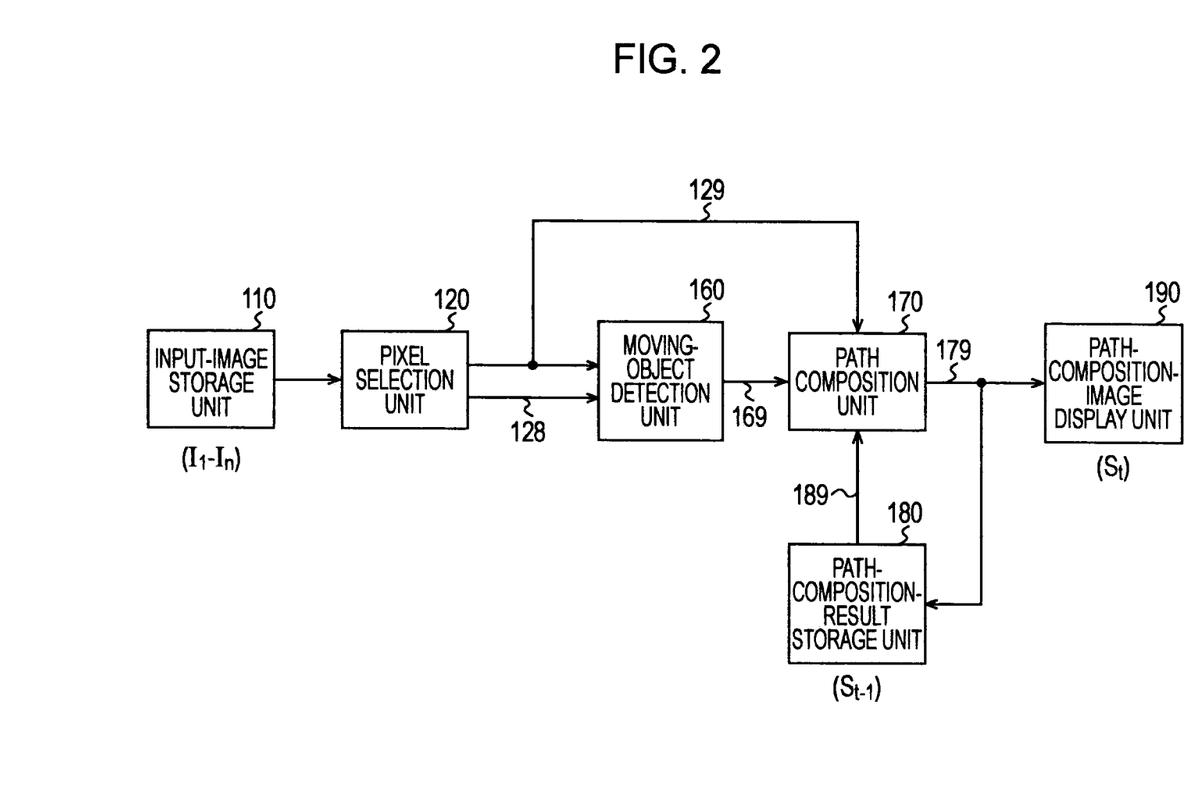
FIG. 2 is a diagram showing an example of an image processing circuit 23 of the image-pickup apparatus according to the embodiment of the present invention.

FIG. 2 is a diagram showing an example of the image processing circuit 23 of the image-pickup apparatus according to the embodiment of the present invention. The image processing circuit 23 in this example includes an input-image storage unit 110, a pixel selection unit 120, a moving-object detection unit 160, a path composition unit 170, a path-composition-result storage unit 180, and a path-composition-image display unit 190.

The input-image storage unit 110 is a memory that stores n (n is an integer that is equal to or more than two) input images ($I_1$ to $I_n$) which have been picked up in chronological sequence. The n input images are set, in the order of times from older ones to new ones in the chronological sequence, as images to be processed. The input-image storage unit 110 has a capacity limit. Accordingly, when new input images are input, the stored input images become invalid in the order starting with the oldest input image among the stored input images, and are overwritten. Accordingly, input images that were picked up for a fixed period are stored at all times in the input-image storage unit 110.

The pixel selection unit 120 sets one of the input images ($I_1$ to $I_n$), which are stored in the input-image storage unit 110, as an image to be processed. Then, the pixel selection unit 120 selects, on the basis of the image to be processed that is set in the middle of the sequence, m (m≤n, wherein m is an integer that is equal to or larger than two) pixel values for a pixel position in input images that are arranged in chronological sequence in a fixed time range. For example, an order in which scan lines are numbered from the left top may be used as an order in which the pixel positions are selected. For example, each of the input images includes p×q (p and q are integers that are equal to or larger than one) pixels that are provided at coordinates (1, 1) to (p, q). In a case in which an input image obtained at a time t (t is an integer that is equal to or larger than two) is set as an image to be processed $I_t$, first, the pixel selection unit 120 selects, on the basis of the image to be processed that is set in the middle of the sequence, m pixel values from among pixel values that are provided at a pixel position which is represented using coordinates (1, 1) in the n input images. Next, the pixel selection unit 120 selects, on the basis of the image to be processed that is set in the middle of the sequence, m pixel values from among pixel values that are provided at a pixel position which is represented using coordinates (1, 2) in the n input images. In this manner, p×q groups of m pixel values are selected for the input images ($I_1$ to $I_n$) in the end. The selected pixel values are supplied to the moving-object detection unit 160 via a signal line 128. Additionally, the pixel values of the image to be processed $I_t$ are supplied to the moving-object detection unit 160 and the path composition unit 170.

The moving-object detection unit 160 calculates, on the basis of m pixel values that are selected by the pixel selection unit 120, a moving-object probability for a pixel value that is provided at each pixel position in the image to be processed $I_t$. In other words, the moving-object detection unit 160 performs detection of a moving object for a pixel value that is provided at each pixel position in the image to be processed $I_t$, and calculates the moving-object probability as information concerning the moving object. The calculated moving-object probability is supplied to the path composition unit 170.

The path composition unit 170 generates a composition ratio on the basis of the moving-object probability, which is calculated by the moving-object detection unit 160. The path composition unit 170 performs compositing by combining the image to be processed $I_t$, which was obtained at the time t, with a path-composition result for a time t−1, which is stored in the path-composition-result storage unit 180, using the composition ratio, whereby producing a path-composition result for the time t. The produced composition result for the time t is supplied to the path-composition-result storage unit 180 and the path-composition-image display unit 190 via a signal line 179.

The path-composition-result storage unit 180 stores a path-composition result that is produced by the path composition unit 170. The path-composition result that is stored in the path-composition-result storage unit 180 is supplied to the path composition unit 170 via a signal line 189 at the following time. In other words, when the input image that was obtained at the time t is set as an image to be processed, the path-composition result for the time t−1 is supplied to the path composition unit 170.

The path-composition-image display unit 190 displays a path-composition image on the basis of a path-composition result that is supplied from the path composition unit 170 via the signal line 179. The display section 43 may be used as it is as the path-composition-image display unit 190. Alternatively, the path-composition-image display unit 190 may be realized using another display device that is connected to the image-pickup apparatus.

Figure 3:
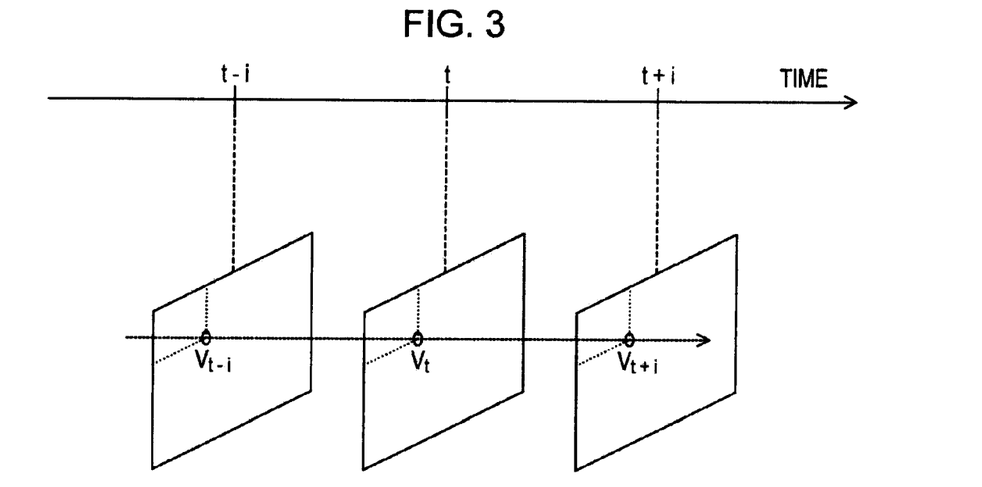
FIG. 3 illustrates a method for selecting pixel values with a pixel selection unit 120 in the embodiment of the present invention.

FIG. 3 illustrates a method for selecting pixel values with the pixel selection unit 120 in the embodiment of the present invention. The pixel selection unit 120 sets an input image $I_t$ that was obtained at the time t as an image to be processed from among the input images ($I_1$ to $I_n$) that are stored in the input-image storage unit 110, and selects pixel values for pixel positions of p×q pixels in the input image $I_t$.

In order to determine whether a pixel value $V_t$ that is provided at one pixel position in the input image $I_t$ indicates a moving object, pixel values are used, which are provided at the pixel position in other input images that are arranged in chronological sequence in which the input image $I_t$ is set in the middle of the sequence. For example, pixel values $V_{t−i}$ and $V_{t+i}$, which are provided at the pixel position in input images $I_{t−1}$ and $I_{t+1}$ that were obtained at times t−i and t+i, respectively, are used.

The larger the number of pixel values that are selected by the pixel selection unit 120, the more useful the number of pixels values in order to increase the accuracy with which a moving-object probability is calculated. On the other hand, calculation cost is increased. For this reason, it is preferable that intervals in which pixel values are selected be adjusted in the below-described consideration of the accuracy with which a moving-object probability is calculated.

Figure 4:
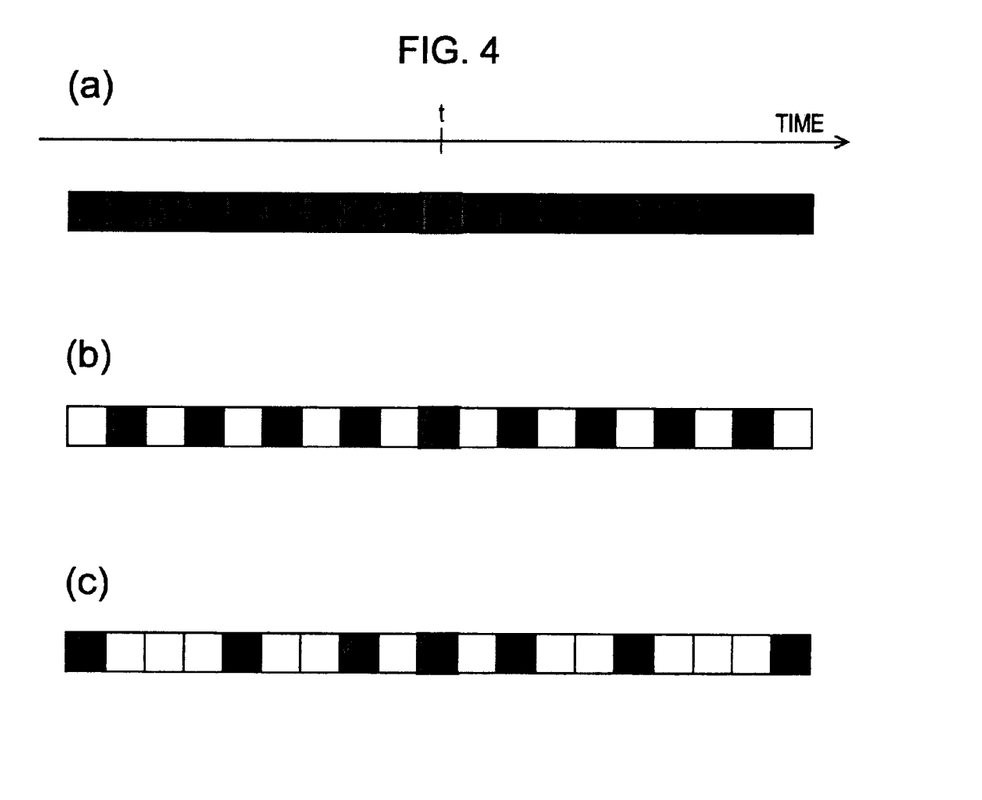
FIG. 4 includes diagrams showing examples of intervals in which pixel values are selected in the embodiment of the present invention.

Parts (a) to (c) of FIG. 4 are diagrams showing examples of intervals in which pixel values are selected in the embodiment of the present invention. Herein, the horizontal axis indicates a time direction for the input images ($I_1$ to $I_n$) Part (a) of FIG. 4 shows an example in which all pixel values that are provided in a fixed range in which the time t is in the middle are selected. Part (b) of FIG. 4 shows an example in which pixel values that are provided in a fixed range in which the time t is in the middle are thinned out at regular intervals, and then selected. Part (c) of FIG. 4 shows an example in which, in a fixed range in which the time t is in the middle, the closer to the time t the times at which pixel values are selected are, the more frequently the pixel values are selected, and in which the farther from the time t the times at which pixel values are selected are, the less frequently the pixel values are selected. In other words, in part (c) of FIG. 4, the closer to the input image It the input images are, the higher the frequency with which pixel values are selected in the input images.

As described above, by selecting pixel values in a manner illustrated in part (b) or (c) of FIG. 4, the number of pixel values can be reduced without changing a time range for selection of pixel values, and degradation of the accuracy with which a moving-object probability is calculated can be reduced, compared with the case illustrated in part (a) of FIG. 4.

Figure 5:
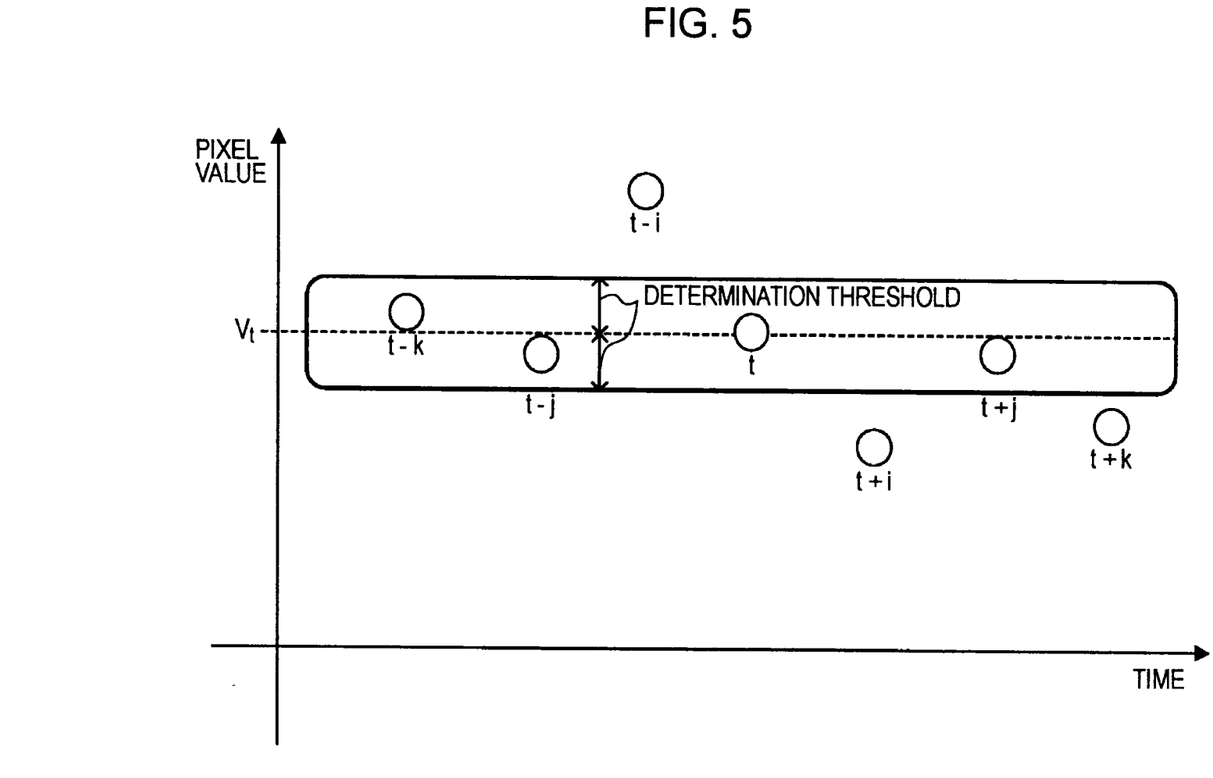
FIG. 5 illustrates a method for determining a moving object with a moving-object detection unit 160 in the embodiment of the present invention.

FIG. 5 illustrates a method for determining a moving object with the moving-object detection unit 160 in the embodiment of the present invention. In FIG. 5, pixel values that are selected by the pixel selection unit 120 are plotted on the time axis and the pixel-value axis. In this example, seven pixel values that are provided in sequence in which a value that was obtained at the time t is in the middle are selected. In order to calculate a moving-object probability of the value that was obtained at the time t, first, the distances between the pixel value $V_t$, which was obtained at the time t, and other pixel values are calculated. It is considered that the higher the ratio of the number of pixel values that are close to the pixel value $V_t$, which was obtained at the time t, to the number of other pixel values, the lower the probability that the pixel value $V_t$ indicates a moving object. For this reason, the moving-object probability that is calculated in such a case is low. In contrast, it is considered that the lower the ratio of the number of pixel values that are close to the pixel value $V_t$, which was obtained at the time t, to the number of other pixel values, the higher the probability that the pixel value $V_t$ indicates a moving object. For this reason, the moving-object probability that is calculated in such a case is high.

The distance between pixels is calculated, for example, as follows. In other words, when a pixel value is represented using RGB values, the distance between a pixel value V1 (R1, G1, B1) and a pixel value V2 (R2, G2, B2) is represented by a distance in Euclidean space, the sum of distances in color spaces, a distance that is obtained using the maximum difference values in the color spaces, or the like. Note that, herein, although an example using RGB color spaces is shown, for example, YCbCr color spaces or other color spaces may be used.

$$\text{distance}(V_1, V_2) = \sqrt{(R_1-R_2)^2+(G_1-G_2)^2+(B_1-B_2)^2}$$

$$\text{distance}(V_1, V_2) = |R_1-R_2|+|G_1-G_2|+|B_1-B_2|$$

$$\text{distance}(V_1, V_2) = \max(|R_1-R_2|, |G_1-G_2|, |B_1-B_2|) \quad (1)$$

The moving-object probability is calculated using a distance that is calculated in the above manner. Herein, the number of other pixel values that exist in a range indicating predetermined determination thresholds is enumerated on the basis of the pixel value $V_t$, which was obtained at the time t. The number is denoted by c (c is an integer satisfying $0 \leq c \leq m-1$). As described above, m is the number of pixel values that are selected by the pixel selection unit 120. Accordingly, a moving-object probability fp is calculated using the following equation:

$$fp = 1 - \frac{c}{n-1} \quad (2)$$

The moving-object probability fp is defined using a real number that is equal to or larger than zero, and that is equal to or smaller than one in the above equation. However, the moving-object probability fp may be defined using two values, zero and one, depending on whether or not the enumeration value C exceeds a threshold th as in the following equation:

$$fp = \begin{cases} 0 & (c \geq th) \\ 1 & (c < th) \end{cases} \quad (3)$$

Figure 6:
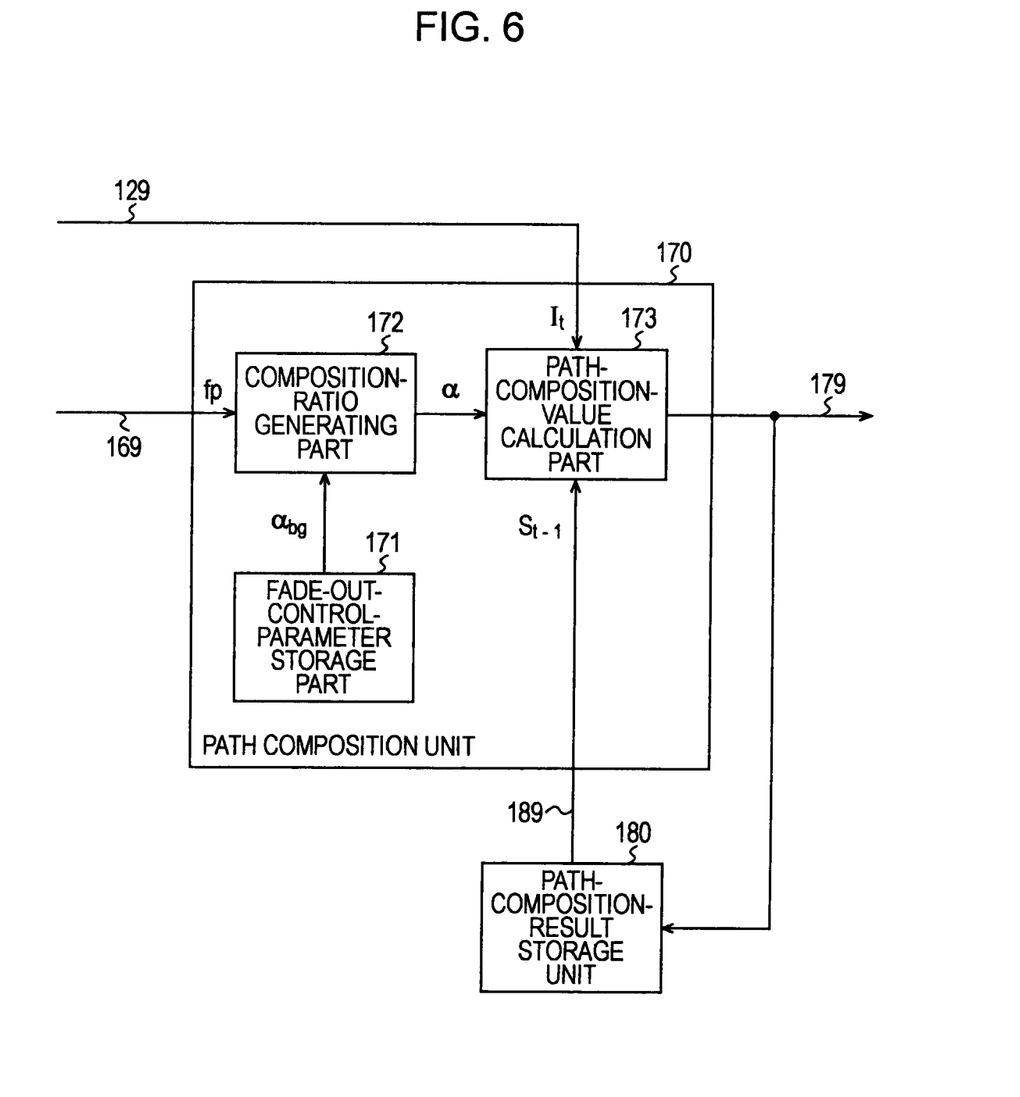
FIG. 6 is a diagram showing an example of a configuration of a path composition unit 170 in the embodiment of the present invention.

FIG. 6 is a diagram showing an example of a configuration of the path composition unit 170 in the embodiment of the present invention. The path composition unit 170 includes a fade-out-control-parameter storage part 171, a composition ratio generating part 172, and a path-composition-value calculation part 173.

The fade-out-control-parameter storage part 171 stores a fade-out-control parameter $\alpha_{bg}$. The fade-out-control parameter $\alpha_{bg}$ indicates a composition ratio of a background. When the fade-out-control parameter $\alpha_{bg}$ is set to be large, an object is gradually mixed into the background over a short period, and fades out.

The composition-ratio generating part 172 generates a composition ratio $\alpha$ for path composition on the basis of the moving-object probability fp, which is supplied from the moving-object detection unit 160 via a signal line 169, and the fade-out-control parameter $\alpha_{bg}$, which is stored in the fade-out-control-parameter storage part 171. The composition ratio $\alpha$ is calculated using the following equation:

$$\alpha = \alpha_{bg} + fp \cdot (1-\alpha_{bg}) \quad (4)$$

When the moving-object probability fp is large, the composition ratio $\alpha$ also becomes large. In such a case, when compositing is performed, a contribution ratio of a pixel value of an original image (the image to be processed $I_t$) to a composition result becomes high. Accordingly, the pixel value of the original image is easily reflected in the composition result as a path. In contrast, when the moving-object probability fp is small, the composition ratio $\alpha$ also becomes small. In such a case, a contribution ratio of a pixel value of a path image that has already been generated to a composition result becomes high. Accordingly, a pixel value of the original image is not easily reflected in the composition result as a path.

As described above, the fade-out-control parameter $\alpha_{bg}$ is a parameter indicating the composition ratio of a background. Because the moving-object probability fp becomes zero in a background region, according to the equation $\alpha = \alpha_{bg}$, a pixel value of the original image is reflected in a composition result. In other words, even when a pixel value of the original image corresponds to a background, compositing is performed by combining the pixel value of the original image with a path that has already been obtained. Accordingly, a fade-out effect can be obtained, in which the older the path, the more the path is mixed into the background. In this manner, the degree of fading out of a path can be controlled by the fade-out-control parameter $\alpha_{bg}$.

The path-composition-value calculation part 173 performs compositing by combining the image to be processed $I_t$, which is supplied from the pixel selection unit 120 via a signal line 129, with the immediately preceding path-composition result $S_{t-1}$, which is supplied from the path-composition-result storage unit 180 via the signal line 189, using the composition ratio $\alpha$, which is generated by the composition-ratio generating part 172. In a case in which an input image that was obtained at the time t and that is represented using coordinates (x, y) is denoted by I(x, y, t), and in which a path-composition result for the time t−1 is denoted by S(x, y, t−1), a path-composition result for the time t S(x, y, t) is calculated using the following equation:

$$S(x, y, t) = \alpha \cdot I(x, y, t) - (1-\alpha) \cdot S(x, y, t-1) \quad (5)$$

A process using the above equation is repeated for all of the pixel positions that are represented using the coordinates (1, 1) to (p, q), whereby compositing is performed to obtain a path image for the time t. Note that, as described above, the larger the moving-object probability fp, the larger the composition ratio $\alpha$. Thus, the image to be processed $I_t$ that indicates a moving object is easily reflected in a composition result as a path.

Figure 7:
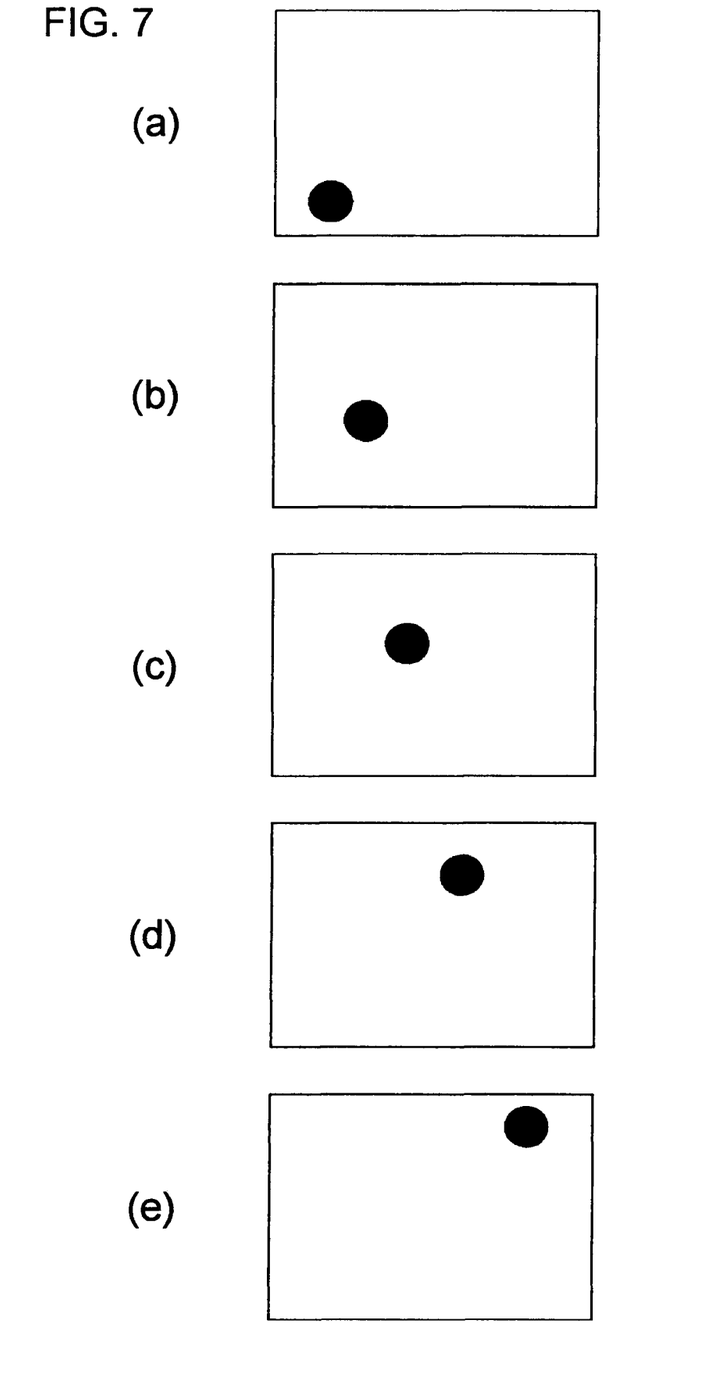
FIG. 7 includes illustrations showing examples of input images.

In order to describe an effect using the fade-out-control parameter $\alpha_{bg}$, it is supposed that pickup images that were picked up in the order of parts (a), (b), (c), (d), and (e) of FIG. 7 are provided as input images. When the fade-out-control parameter $\alpha_{bg}$ is set to "zero", the composition ratio $\alpha$ becomes equal to the moving-object probability fp. It is supposed that the moving-object probability fp becomes "one" in a moving-object region, and that the moving-object probability fp becomes "zero" in a background region. In this case, because mixing of a background with a moving object does not occur when compositing is performed, all paths of the moving object are displayed with a dark color, as shown in FIG. 8A, in a path-composition image that is obtained in the end.

In contrast, when the fade-out-control parameter $\alpha_{bg}$ is set to about "0.3", the composition ratio a becomes a value that exists in a range of "0.3" to "1". It is supposed that the moving-object probability fp becomes "one" in the moving-object region, and that the moving-object probability fp becomes "zero" in the background region. In this case, because mixing of the background with the moving object occurs every time compositing is performed, the older the path, the lighter the color of the path that is displayed, as shown in FIG. 8B, in a path-composition image that is obtained in the end.

Figure 8A:
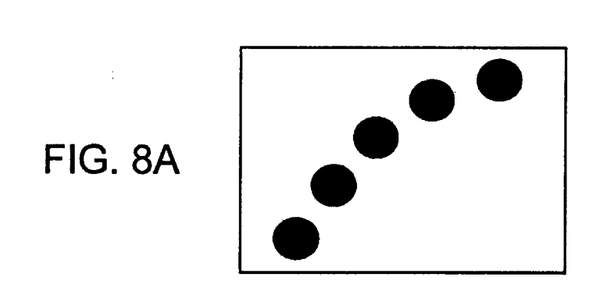
FIGS. 8A to 8C are illustrations showing examples of path-composition images.
Figure 8B:
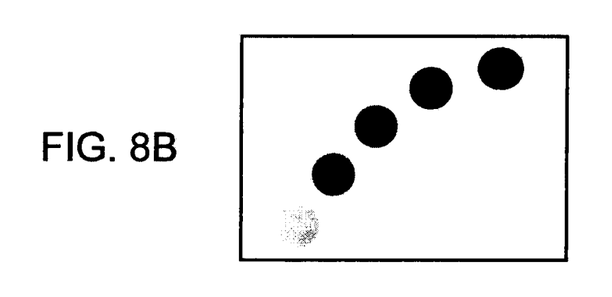
Figure 8C:
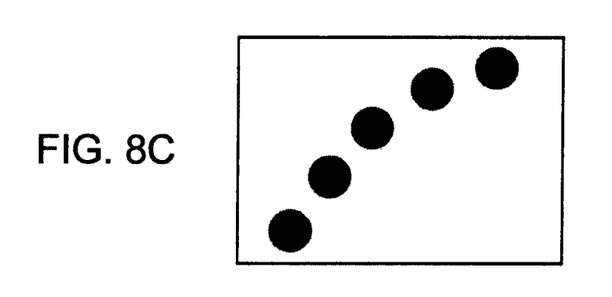
Figure 9:
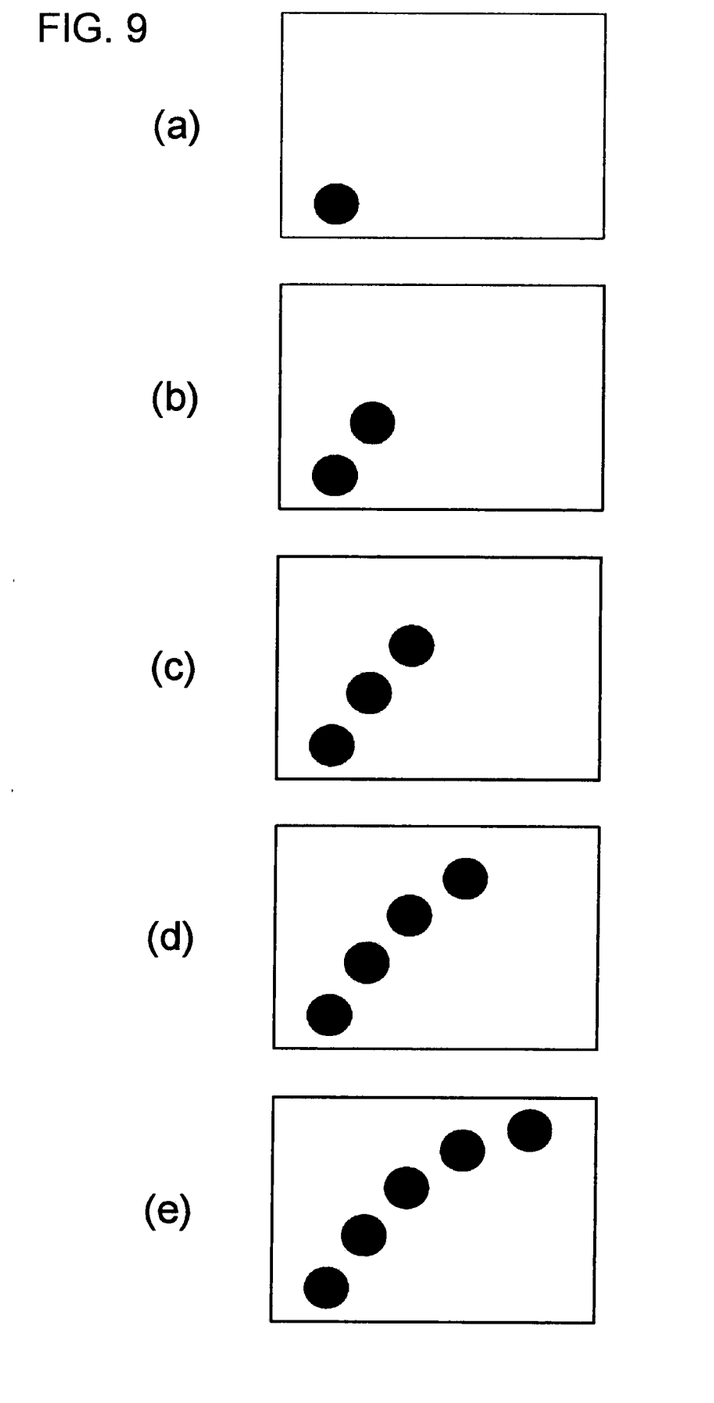
FIG. 9 includes illustrations showing examples of outputs which are extracted from a path-composition moving image and in which states are displayed in chronological sequence.
Figure 10:
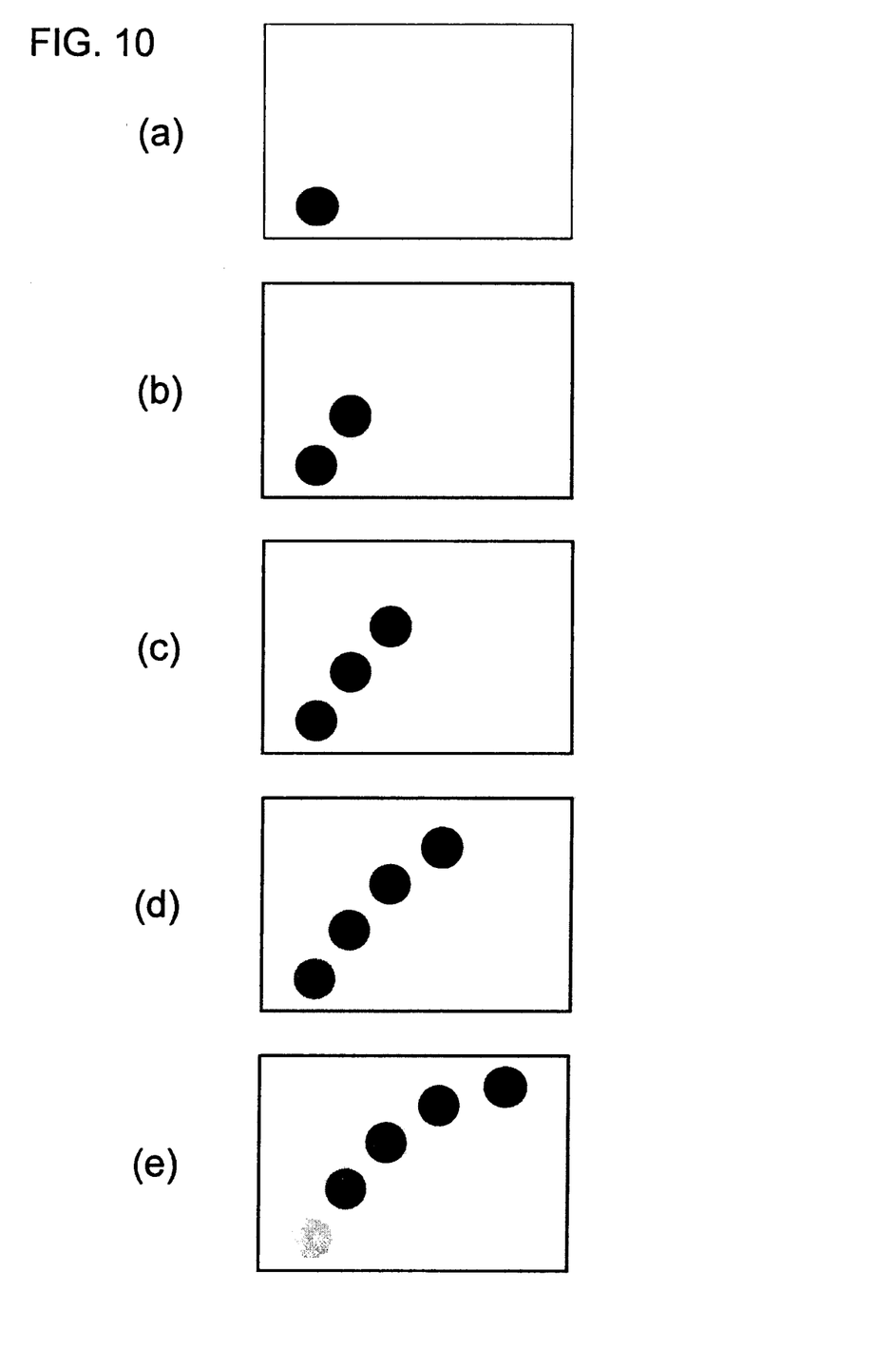
FIG. 10 includes illustrations showing other examples of outputs which are extracted from a path-composition moving image and in which states are displayed in chronological sequence.

Furthermore, although one path-composition image is displayed as shown in FIG. 8A or 8B, states in which a moving object is moving may be displayed in chronological sequence in path-composition images as shown in parts (a) to (e) of FIG. 9 or parts (a) to (e) of FIG. 10. Also in this case, the degree of fading out of a path can be controlled by the fade-out-control parameter $\alpha_{bg}$. For example, in a case in which it is desired that a path clearly remain, when the fade-out-control parameter $\alpha_{bg}$ is set to "zero", the composition ratio a becomes equal to the moving-object probability fp. It is supposed that the moving-object probability fp becomes "one" in a moving-object region, and that the moving-object probability fp becomes "zero" in a background region. In this case, because mixing of a background with a moving object does not occur when compositing is performed, all paths of the moving object are displayed with a dark color, as shown in parts (a) to (e) of FIG. 9, in path-composition images in which states in which the moving object is moving are displayed.

In contrast, in a case in which it is desired that the path fade out, when the fade-out-control parameter $\alpha_{bg}$ is set to about "0.3", the composition ratio α becomes a value that exists in a range of "0.3" to "1". It is supposed that the moving-object probability fp becomes "one" in the moving-object region, and that the moving-object probability fp becomes "zero" in the background region. In this case, because mixing of the background with the moving object occurs every time compositing is performed, the older the path, the lighter the color of the path that is displayed, as shown in parts (a) to (e) of FIG. 10, in path-composition images in which states in which the moving object is moving are displayed.

Figure 11:
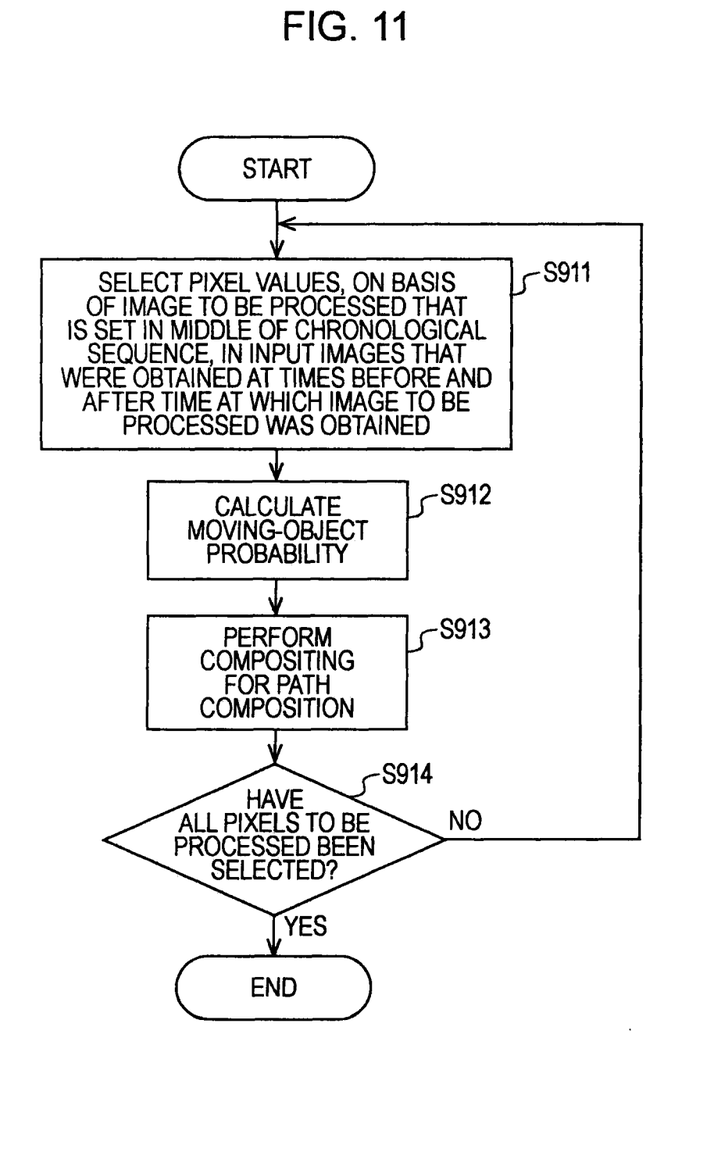
FIG. 11 is a flowchart showing an example of a process procedure performed by the image-pickup apparatus according to the embodiment of the present invention.

Next, the operation of the image-pickup apparatus according to the embodiment of the present invention will be described with reference to the accompanying drawings. FIG. 11 is a flowchart showing an example of a process procedure performed by the image-pickup apparatus according to the embodiment of the present invention.

First, pixel values that are provided at a pixel position in input images which are arranged in chronological sequence and which were obtained at times before and after a time at which an input image to be processed was obtained are selected by the pixel selection unit 120 on the basis of the input image to be processed that is set in the middle of the sequence (step S911). The relationships among the input images in a case in which the pixel values are selected have been described with reference to FIG. 3 and parts (a) to (c) of FIG. 4.

Then, the moving-object probability is calculated by the moving-object detection unit 160 using the selected pixel values (step S912). The process for calculating the moving-object probability has been described with reference to FIG. 5.

The composition ratio α is generated by the path composition unit 170 using the moving-object probability that has been calculated in this manner. Compositing is performed by combining the image to be processed It with the immediately preceding path-composition result $S_{t-1}$ to obtain a result, and the result is output (step S913).

When the above-described processes are completed for each of the pixel positions of p×q pixels in the image to be processed, processes that are necessary to be performed for the image to be processed are completed (step S914). The processes of steps S911 to S913 can be independently performed for each of the pixel positions.

The processes of steps S911 to S914 are completed in a case in which an input image that was obtained at the time t is set as the image to be processed. After that, the processes of steps S911 to S914 are repeated in cases in which input images that were obtained at the time t+1 and at times later than the time t+1 are set as images to be processed, whereby path-composition images can be sequentially and chronologically generated. These processes that are necessary to be performed for the images to be processed can be independently performed for each of the images to be processed.

As described above, according to the embodiment of the present invention, a moving object is detected directly from input images that are arranged in chronological sequence, without generating a background in advance. Thus, cost for calculation that is performed in order to estimate a background, and cost for storage of a background image can be reduced, and paths of the moving object can be efficiently obtained. Furthermore, even when a background changes, a moving object can be stably detected by the above-described sequential detection of the moving object. In other words, an image processing apparatus can be realized, which is capable of generating a path-composition image for a moving object with a high accuracy, regardless of the state of a background in pickup images, the number of moving objects, the size of a moving object, deformation of a moving object, the color of a moving object, or the like.

Additionally, the embodiment of the present invention has been described on the supposition that images have been continuously picked up by the image-pickup apparatus, such as a digital still camera or a digital camcorder. However, the present invention is not limited to the embodiment image data items that have been obtained by a reproducing apparatus via a broadcasting network or the Internet, or the like may be used as the input images.

Furthermore, the embodiment of the present invention is illustrated by way of example to realize the present invention. Although there is a correspondence between the embodiment and the features of the claims, which will be described below, the present invention is not limited thereto, and various modifications can be made without departing from the spirit and scope of the present invention.

In other words, according to an embodiment of the present invention, pixel selecting means corresponds to, for example, the pixel selection unit 120. Moving-object detecting means corresponds to, for example, the moving-object detection unit 160. Output-image generating means corresponds to, for example, the path composition unit 170 and the path-composition-result storage unit 180.

Furthermore, according to an embodiment of the present invention, output-image storing means corresponds to, for example, the path-composition-result storage unit 180. Composition-ratio generating means corresponds to, for example, the composition-ratio generating part 172. Composition-value calculating means corresponds to, for example, the path-composition-value calculation part 173.

Moreover, according to an embodiment of the present invention, background-composition-ratio storing means corresponds to, for example, the fade-out-control-parameter storage part 171.

Additionally, according to embodiments of the present invention, selecting pixels corresponds to, for example, step S911. Detecting a moving object corresponds to, for example, step S912. Generating an output image corresponds to, for example, step S913.

The processing procedure described in the embodiment of the present invention may be considered as a method having the series of processes, or may be considered as a program for causing a computer to execute the series of processes or as a recording medium on which the program is recorded.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
pixel selecting means for selecting pixel values that are provided at each of pixel positions in input images which are arranged in chronological sequence, each of the pixel values being included in a corresponding one of the input images, on the basis of an input image to be processed that is set in the middle of the sequence;
moving-object detecting means for detecting a moving object using the selected pixel values, and producing information items concerning the moving object as moving-object information items, wherein
the moving-object detecting means calculates, as the moving-object information items, probabilities that the pixel values of the input image to be processed indicate a moving object, and
the probabilities for the pixel values of the input image to be processed at each pixel position are calculated based on distances between the pixel values in the input images at the corresponding pixel position, and on a ratio of a number of calculated distances at the corresponding pixel position that are greater than a predetermined threshold and a number of input images that are not the input image to be processed; and
output-image generating means for generating pixel values of an output image, each of the pixel values being generated for a corresponding one of the pixel positions by using, in accordance with a corresponding one of the moving-object information items, a corresponding one of pixel values of the input image to be processed.

2. The image processing apparatus according to claim 1, wherein calculating each of probabilities that a corresponding one of the pixel values of the input image to be processed indicates a moving object further comprises:
determining whether each of probabilities that the pixel values that are chronologically selected for a corresponding one of the pixel positions in the input images on the basis of the input image to be processed, which is set in the middle of the sequence, do not exist in a predetermined range that is provided on the basis of the corresponding one of the pixel values of the image to be processed.

3. The image processing apparatus according to claim 1, wherein the pixel selecting means selects the pixel values so that the pixel values are spaced at regular time intervals.

4. The image processing apparatus according to claim 1, wherein
the chronological sequence of input images starts at a first input image and ends at a last input image, and the input image to be processed is in the middle of the chronological sequence, and
the pixel selecting means selects the pixel values in such a manner that, within the chronological sequence, the closer to the input image to be processed the input images are, the higher the frequency with which the pixel values are selected in the input images.

5. The image processing apparatus according to claim 1, wherein the output-image generating means includes:
output-image storing means for storing the pixel values of the output image;
composition-ratio generating means for generating composition ratios, each of the composition ratios being generated for a corresponding one of the pixel positions in accordance with a corresponding one of the moving-object information items; and
composition-value calculating means for obtaining composition pixel values, each of the composition pixel values being obtained for a corresponding one of the pixel positions by combining a corresponding one of the pixel values of the input image to be processed with a corresponding one of the pixel values of the output image, which are stored by the output-image storing means, using a corresponding one of the composition ratios, and for causing the output-image storing means to store the obtained composition pixel values as pixel values of a new output image.

6. The image processing apparatus according to claim 5, wherein the output-image generating means further includes background-composition-ratio storing means for storing, as background composition ratios, the composition ratios for a case in which the pixel values of the input image to be processed do not indicate a moving object, and
wherein the composition-ratio generating means generates the composition ratios on the basis of the probabilities that the pixel values of the input image to be processed indicate a moving object and on the basis of the background composition ratios.

7. An image processing method comprising the steps of:
chronologically selecting pixel values that are provided at each of pixel positions in input images which are arranged in chronological sequence, each of the pixel values being included in a corresponding one of the input images, on the basis of an input image to be processed that is set in the middle of the sequence;
detecting a moving object using the selected pixel values, and producing information items concerning the moving object as moving-object information items, wherein
producing moving-object information items comprises calculating probabilities that the pixel values of the input image to be processed indicate a moving object, and
the probabilities for the pixel values of the input image to be processed at each pixel position are calculated based on distances between the pixel values in the input images at the corresponding pixel position, and on a ratio of a number of calculated distances at the corresponding pixel position that are greater than a predetermined threshold and a number of input images that are not the input image to be processed; and
generating pixel values of an output image, each of the pixel values being generated for a corresponding one of the pixel positions by using, in accordance with a corresponding one of the moving-object information items, a corresponding one of pixel values of the input image to be processed.

8. A non-transitory computer-readable medium containing a program causing a computer to execute the steps comprising:
chronologically selecting pixel values that are provided at each of pixel positions in input images which are arranged in chronological sequence, each of the pixel values being included in a corresponding one of the input images, on the basis of an input image to be processed that is set in the middle of the sequence;
detecting a moving object using the selected pixel values, and producing information items concerning the moving object as moving-object information items, wherein producing moving-object information items comprises calculating probabilities that the pixel values of the input image to be processed indicate a moving object, and the probabilities for the pixel values of the input image to be processed at each pixel position are calculated based on distances between the pixel values in the input images at the corresponding pixel position, and on a ratio of a number of calculated distances at the corresponding pixel position that are greater than a predetermined threshold and a number of input images that are not the input image to be processed; and generating pixel values of an output image, each of the pixel values being generated for a corresponding one of the pixel positions by using, in accordance with a corresponding one of the moving-object information items, a corresponding one of pixel values of the input image to be processed.

9. An image processing apparatus comprising:

a pixel selecting unit configured to select pixel values that are provided at each of pixel positions in input images which are arranged in chronological sequence, each of the pixel values being included in a corresponding one of the input images, on the basis of an input image to be processed that is set in the middle of the sequence;

a moving-object detecting unit configured to detect a moving object using the selected pixel values, and configured to produce information items concerning the moving object as moving-object information items, wherein the moving-object detecting unit calculates, as the moving-object information items, probabilities that the pixel values of the input image to be processed indicate a moving object, and the probabilities for the pixel values of the input image to be processed at each pixel position are calculated based on distances between the pixel values in the input images at the corresponding pixel position, and on a ratio of a number of calculated distances at the corresponding pixel position that are greater than a predetermined threshold and a number of input images that are not the input image to be processed; and an output-image generating unit configured to generate pixel values of an output image, each of the pixel values being generated for a corresponding one of the pixel positions by using, in accordance with a corresponding one of the moving-object information items, a corresponding one of pixel values of the input image to be processed.

10. The image processing method according to claim 7, wherein calculating each of probabilities that a corresponding one of the pixel values of the input image to be processed indicates a moving object further comprises:

determining whether each of probabilities that the pixel values that are chronologically selected for a corresponding one of the pixel positions in the input images on the basis of the input image to be processed, which is set in the middle of the sequence, do not exist in a predetermined range that is provided on the basis of the corresponding one of the pixel values of the image to be processed.

11. The image processing method according to claim 7, wherein the selected pixel values are selected so that the pixel values are spaced at regular time intervals.

12. The image processing apparatus according to claim 1, wherein the chronological sequence of input images starts at a first input image and ends at a last input image, and the input image to be processed is in the middle of the chronological sequence, and the selected pixel values are selected in such a manner that, within the chronological sequence, the closer to the input image to be processed the input images are, the higher the frequency with which the pixel values are selected in the input images.

13. The image processing method according to claim 7 further comprising:

storing the pixel values of the output image;

generating composition ratios, each of the composition ratios being generated for a corresponding one of the pixel positions in accordance with a corresponding one of the moving-object information items;

obtaining composition pixel values, each of the composition pixel values being obtained for a corresponding one of the pixel positions by combining a corresponding one of the pixel values of the input image to be processed with a corresponding one of the stored pixel values of the output image, using a corresponding one of the composition ratios; and storing the obtained composition pixel values as pixel values of a new output image.

14. The image processing method according to claim 13 further comprising:

storing, as background composition ratios, the composition ratios for a case in which the pixel values of the input image to be processed do not indicate a moving object, and generating the composition ratios on the basis of the probabilities that the pixel values of the input image to be processed indicate a moving object and on the basis of the background composition ratios.

15. The non-transitory computer-readable medium of claim 8, wherein the steps further comprising:

determining whether each of probabilities that the pixel values that are chronologically selected for a corresponding one of the pixel positions in the input images on the basis of the input image to be processed, which is set in the middle of the sequence, do not exist in a predetermined range that is provided on the basis of the corresponding one of the pixel values of the image to be processed.

16. The non-transitory computer-readable medium of claim 8, wherein the selected pixel values are selected so that the pixel values are spaced at regular time intervals.

17. The non-transitory computer-readable medium of claim 8, wherein the chronological sequence of input images starts at a first input image and ends at a last input image, and the input image to be processed is in the middle of the chronological sequence, and the selected pixel values are selected in such a manner that, within the chronological sequence, the closer to the input image to be processed the input images are, the higher the frequency with which the pixel values are selected in the input images.

18. The non-transitory computer-readable medium of claim 8, wherein the steps further comprise:

storing the pixel values of the output image;

generating composition ratios, each of the composition ratios being generated for a corresponding one of the pixel positions in accordance with a corresponding one of the moving-object information items;

obtaining composition pixel values, each of the composition pixel values being obtained for a corresponding one of the pixel positions by combining a corresponding one of the pixel values of the input image to be processed with a corresponding one of the stored pixel values of the output image, using a corresponding one of the composition ratios; and storing the obtained composition pixel values as pixel values of a new output image.

19. The non-transitory computer readable medium of claim 18, wherein the steps further comprise:

storing, as background composition ratios, the composition ratios for a case in which the pixel values of the input image to be processed do not indicate a moving object, and generating the composition ratios on the basis of the probabilities that the pixel values of the input image to be processed indicate a moving object and on the basis of the background composition ratios.

* * * * *